United States Patent [19]
Currie

[11] Patent Number: 5,413,069
[45] Date of Patent: May 9, 1995

[54] MULTI-FACETED BIRD FEEDER WITH INTEGRAL LIGHT

[76] Inventor: Richard L. Currie, 1504 Elf Stone Ct., Casselberry, Fla. 32707

[21] Appl. No.: 139,732

[22] Filed: Oct. 22, 1993

[51] Int. Cl.⁶ .............................................. A01K 39/01
[52] U.S. Cl. .................................... 119/52.2; 119/57.8
[58] Field of Search ................... 119/52.2, 52.3, 57.8, 119/57.9; 43/113

[56] References Cited

U.S. PATENT DOCUMENTS

| | | | |
|---|---|---|---|
| 1,132,973 | 3/1915 | Rappleye | 119/52.2 |
| 2,216,511 | 10/1940 | Copeman | 119/52.2 |
| 2,532,726 | 12/1950 | Lajoie et al. | 119/52.2 |
| 3,662,889 | 5/1972 | Takarabe | 210/169 |
| 4,389,975 | 6/1983 | Fisher, Jr. | 119/52.3 |
| 4,838,205 | 6/1989 | Larson | 119/52.2 |
| 5,105,764 | 4/1992 | Primeau | 119/52.3 |
| 5,163,382 | 11/1992 | Morrison | 119/57.9 |

*Primary Examiner*—Todd E. Manahan
*Attorney, Agent, or Firm*—Julian C. Renfro

[57] ABSTRACT

A multisided bird feeder for dispensing bird seed from a plurality of spaced-apart locations has a plurality of vertically disposed, substantially identical side members secured in an edge-to-edge relationship to form a closed perimeter. The base member and roof member being utilized are common to the side members, with the base member and roof member together with the side members forming an enclosed multisided bird feeder. A repository for bird seed is located in a central interior portion of the feeder, and an elongate trough portion is operatively associated with a lower part of each side member. An aperture is located in certain of the side members, just above the respective trough portion, with each aperture enabling seed to flow from the repository into the respective trough portions. The repository for bird seed is accessible from an uppermost portion of the bird feeder, and a flow director is located adjacent the lowermost portion of the repository for bird seed, serving to cause bird seed poured into the repository to flow in substantially equal quantities into the plurality of trough portions. A window is provided in at least some of the sides of the bird feeder, and at least one illumination device is provided in the interior of the bird feeder, such that light can be projected outwardly through the windows, to provide illumination to the area around the bird feeder at times selected by the user.

23 Claims, 6 Drawing Sheets

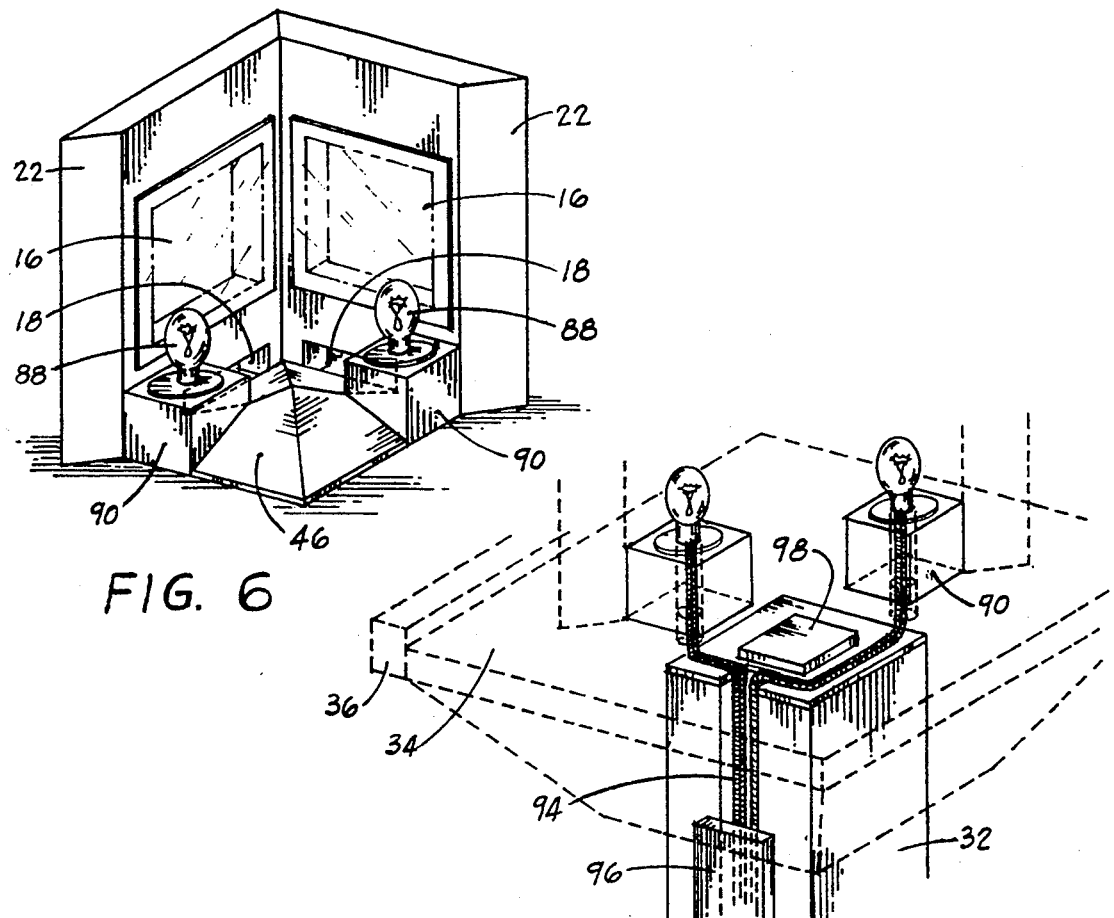
FIG. 6
FIG. 7
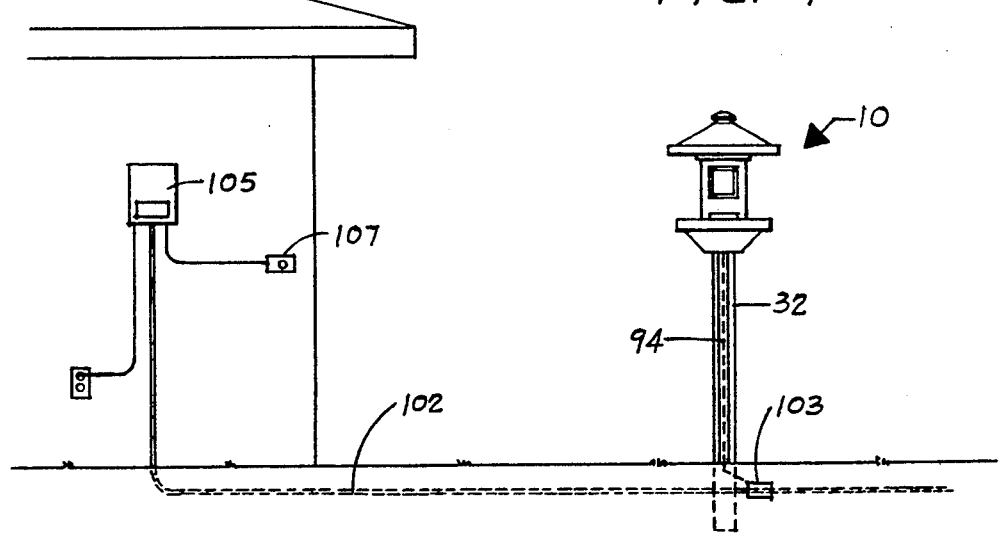
FIG. 7A

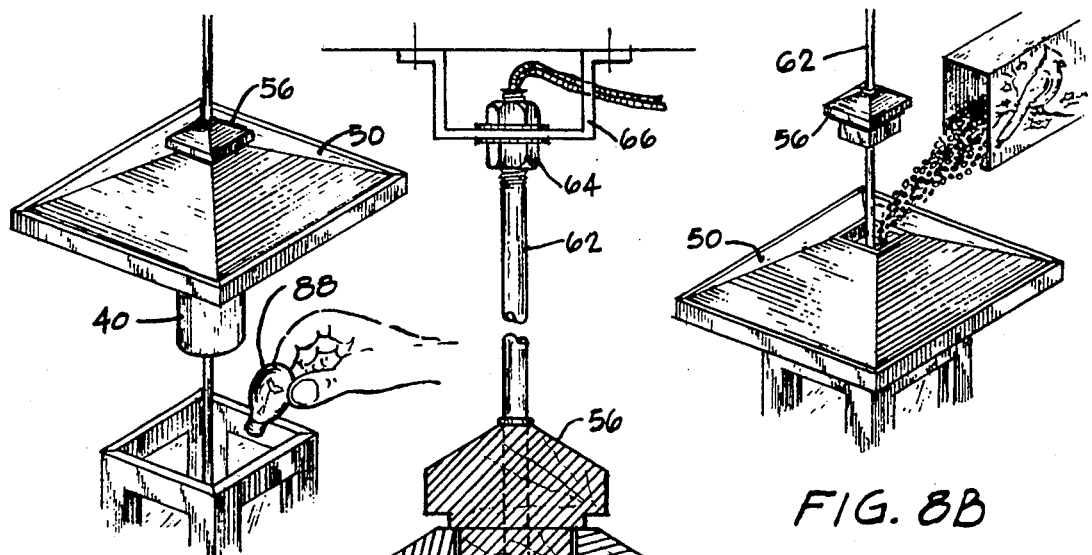
FIG. 8A
FIG. 8B
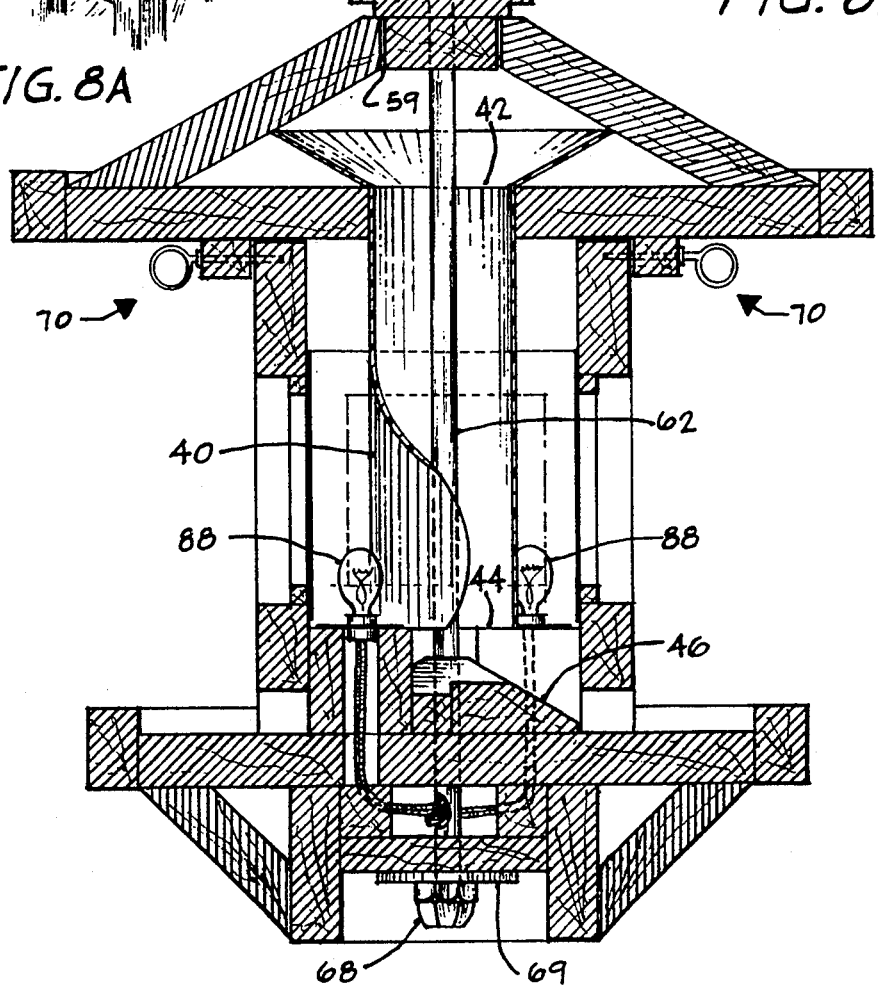
FIG. 8

MULTI-FACETED BIRD FEEDER WITH INTEGRAL LIGHT

BACKGROUND OF THE INVENTION

1. Field of the Invention

This invention relates to an improved feeder, and more particularly to a feeder of a combinational type, primarily for the feeding of birds.

2. Discussion of the Prior Art

In the past a number of types of improved bird feeders have been proposed, with one of these being the Podjan U.S. Pat. No. 4,204,500 entitled "Bird Feeder Construction," which is a device utilizing a sidewall structure in the form of a collapsible tubular structure formed from a plurality of interfitting concentric rings which telescope, one within the other. This bird feeder permits feeding on all sides thereof, but it does not utilize any means for dividing or directing the flow, so as to assure substantially equal amounts of feed reaching all sides of the device.

Another type of improved bird feeder is represented by the Vandiver U.S. Pat. No. 4,867,104 entitled "Bird Feeder with Squirrel Guard," which utilizes roller elements disposed around all sides of the bird feeder, which denies firm footing for squirrels, thereby preventing these animals from consuming the seeds intended for birds. However, this is necessarily an expensive device, and it does not provide any particular advantage other than this feature.

Still another improved type of bird feeder is represented by the Bescherer U.S. Pat. No. 4,318,364 entitled "Bird Feeding Device," which teaches a feeder in which two varieties of granulated bird feed may be dispensed from a single device, but this device is necessarily expensive to construct and to maintain, and preferably utilizes aluminum as the construction material, which has been found dangerous for use with birds.

It was in an effort to overcome the disadvantages and shortcomings of these and other such devices that the present invention was made.

SUMMARY OF THE INVENTION

A multisided bird feeder for dispensing bird seed or the like involves, in accordance with this invention, a plurality of spaced-apart locations entailing the use of a plurality of vertically disposed, substantially identical side members, which side members are secured in an edge-to-edge relationship to form a closed perimeter. A distinct base member and a roof member are utilized, each of which are common to the side members. The base member and roof member together with the side members form a fully enclosed multisided bird feeder, in the central interior portion of which, a repository for bird seed may be disposed. An elongate trough is operatively associated with a lower part of each side member, and an aperture located in each side member, just above the trough, enables seed to flow from the repository into the trough. A perch is formed along an outboard portion of the trough, upon which a bird can stand while eating seed from the trough. This trough may be of unitary construction and supported from the base member.

In order for bird seed to be distributed substantially equally between the several sides of the bird feeder, I quite advantageously utilize a flow director that is preferably disposed adjacent the bottom of the central repository, serving to cause bird seed poured into the repository to flow in substantially equal quantities into the various portions of the trough.

At least some of the side members are fitted with a closed window of transparent or translucent material. In the event a source of illumination is contained in the interior of the bird feeder, the light can be projected outwardly through the windows.

The construction I utilize makes it readily possible to remove the top of the feeder at such time as the supply of seeds is to be replenished, but in addition, this arrangement provides ready access to the interior of the feeder, so that the bulb or bulbs utilized as the illumination means can be readily replaced when such is needed.

From the standpoint of support, mounting means for the bird feeder may be located in an upper portion of the bird feeder, but as an alternative, the mounting means for the bird feeder is located in a lower portion of the bird feeder.

It is a primary object of my invention to provide a bird feeder of highly advantageous yet inexpensive construction, which can take the form of a highly attractive device serving to improve the appearance of any location in which it is used.

It is another object of this invention to provide a bird feeder of a construction such as to be relative inexpensive to manufacture, easy to maintain, and which serves as a most effective and attractive means for feeding birds.

It is yet another object of this invention to provide a bird feeder of a construction such as to enable at least two forms of a central repository for bird seed to be used, with a flow director provided at the lower portion of the repository, so as to effect a substantially even distribution of seeds to various trough portions of the bird feeder.

It is yet still another object of this invention to provide a bird feeder having sides in which windows are used, so as not only to enable the user to ascertain the amount of seeds remaining in the device, but more importantly, permitting a source of illumination to be used inside the feeder.

It is yet still another object to provide illumination means for a bird feeder, not only for safety reasons, but also for attracting insects, which in turn attract any of several varieties of night feeding birds.

These and other objects, features and advantages of this invention will become more apparent as the description proceeds.

BRIEF DESCRIPTION OF THE DRAWINGS

FIG. 1 is a perspective view of my bird feeder, showing top, bottom and side members together forming an enclosure for bird seed, with this particular embodiment of my bird feeder being supported atop a post or the like;

FIG. 6 is a fragmentary perspective view revealing the internal construction of the bird feeder embodiment of FIGS. 1 through 3, with the illumination means I prefer to use being depicted in some detail;

FIG. 7 is a fragmentary perspective view of a base portion of my bird feeder, with the sides of the bird feeder entirely removed, so as to depict the wiring arrangement that may be utilized for supplying electric current to the illumination means;

FIG. 7A is a side elevational view depicting the manner in which the bird feeder may be supported in an operative relationship to a device for turning on and off the illumination means that may be utilized in my bird feeder;

FIG. 8 is a cross sectional view of a bird feeder similar to that illustrated in FIG. 3A, but in this instance being supported from above by the use of a threaded tubular member extending down through the bird feeder, in which tubular member electric wiring may be provided;

FIG. 8A is a perspective view to a somewhat smaller scale, with the roof member lifted away sufficiently far as to enable a bulb to be replaced;

FIG. 8B is a similar perspective view to FIG. 8A, but in this instance showing only the removable central roof member lifted away to permit bird seed to be poured into the central repository;

DETAILED DESCRIPTION

Figure 1:
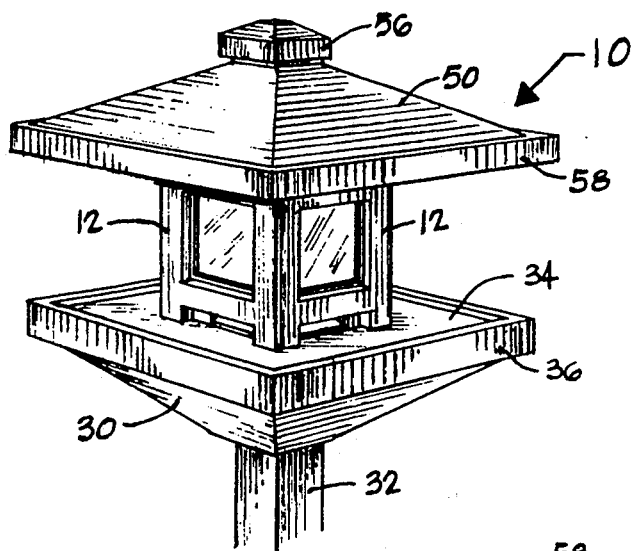
Figure 2A:
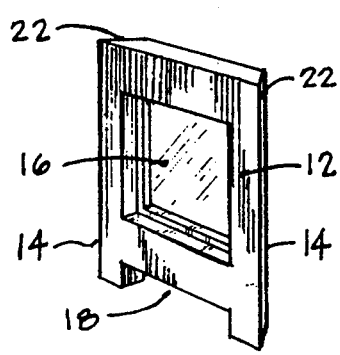
FIG. 2A is a perspective view of a typical side member of the bird feeder, revealing that although the side edges of the side member are parallel, they are nevertheless cut at an angle so as to permit a plurality of side members to be joined tightly together to form a weatherproof enclosure for bird seed.

With initial reference to FIG. 1, it will be seen that I have provided a multisided bird feeder 10 for dispensing bird seed or the like from a plurality of spaced-apart locations around the periphery of the device. The bird feeder has a plurality of vertically disposed, substantially identical side members 12. As shown in FIG. 2A, where a typical side member is depicted, each of the side members 12 has substantially parallel side edges 14, meaning that the width dimension across the top of the side member is the same as the width dimension across the bottom. This view reveals that the window 16 occupies a high percentage of the surface area of the respective side member 12 of the bird feeder.

Despite the fact that the side edges are parallel, the edges are preferably cut at an angle, rather than being square cut. In other words, both of the side edges of each side member have a bevel or mitre cut 22, so that a plurality of side members can be joined together to form a tightly fitted enclosure, as will be discussed hereinafter. These beveled side edges 22 are visible in FIGS. 2A and 6.

Figure 3:
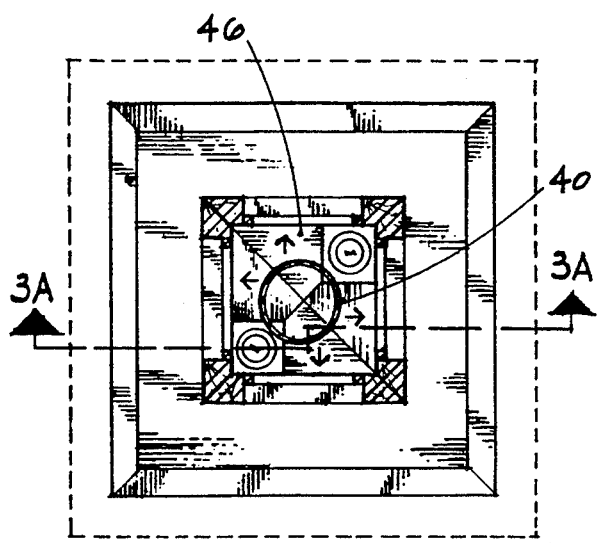
FIG. 3 is a top view of the bird feeder of FIG. 2 with the roof member removed to reveal internal construction.
Figure 9:
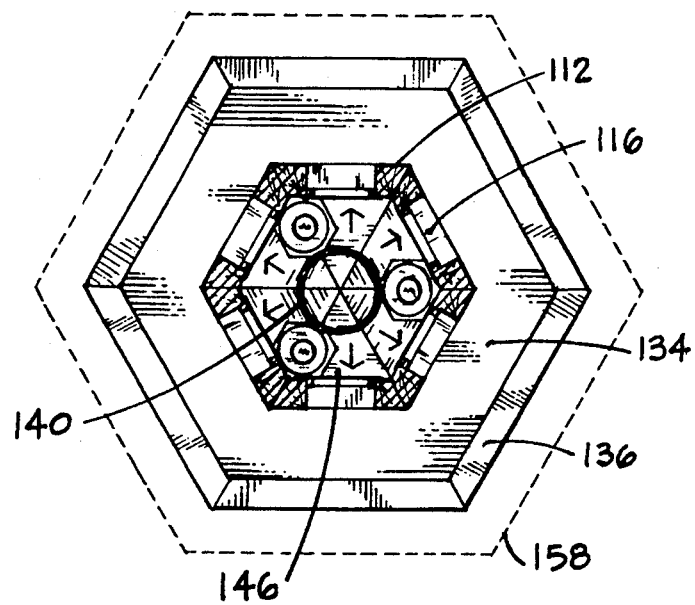
FIG. 9 is a plan view of a six-sided bird feeder that may be constructed in accordance with this invention.

As depicted in the first several figures, each side member may have a window 16 as well as a lower, rectangularly-shaped slot or passageway 18. It is not required that every side member of my bird feeder have a window as well as a lower, rectangularly-shaped slot, but it is typical for these to be included in each side member. By utilizing the previously-mentioned mitre or bevel cut along the side edges of the side members, the side members can be joined together to form a closed perimeter, as shown in FIG. 3 for a four-sided feeder, and as shown in FIG. 9 for a hexagonally-shaped feeder.

Continuing with FIG. 2A, for a four-sided bird feeder, the side edges 14 are obviously cut at a 45° angle with respect to the exterior surface of the side member, to produce the beveled side edges 22. These beveled side edges of adjacent side members 12 are typically held together in a carefully aligned relationship by the use of weatherproof glue. If desired, however, I could hold the abutting beveled edges 22 together by the use of nails, screws or other suitable types of joinder arrangements, either in addition to, or apart from, the glue being used.

Figure 2:
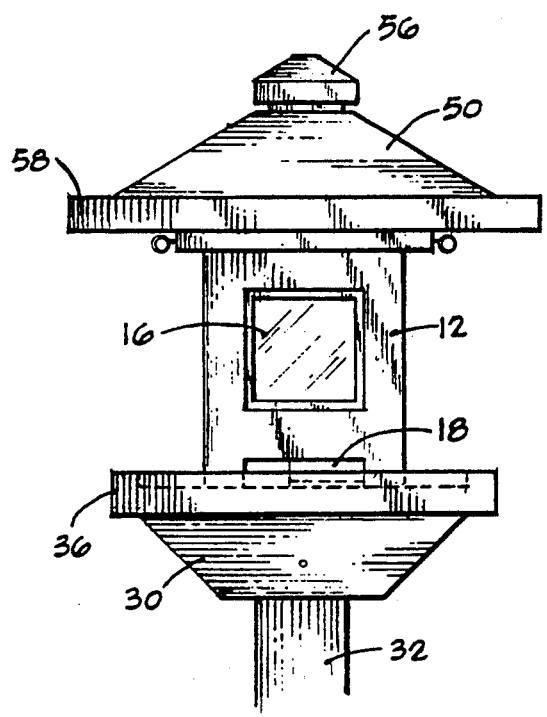
FIG. 2 is a side elevational view of the bird feeder of FIG. 1, with this view revealing the use of a window occupying a high percentage of the surface area of the side member of the bird feeder.

From FIGS. 1 and 2 it will be noted that I have provided a base member 30 and a roof member 50 that are common to the enclosure created by the joined side members 12, and it is to be realized that the base member and roof member together with the side members form a fully enclosed multisided bird feeder. However, as will be shortly explained, bird seed added to the feeder from time to time to replenish the seed eaten by birds does not, in the embodiments depicted in FIGS. 3, 3A and 8, come into direct contact with the interior portions of the side members 12.

FIG. 2 reveals an embodiment of my bird feeder in which the base member 30 is supported from a lower support, such as a post 32. The base member is typically not of one piece construction, but rather includes a generally horizontally disposed trough member 34, as will soon be described. As will be seen hereinafter in conjunction with FIG. 8, another embodiment of a bird feeder in accordance with this invention may involve a device supported from above, such as from a metallic tubular member 62, or by a cable, chain or strong cord.

All embodiments of my bird feeder are equipped with a trough member 34 that preferably forms the upper part of the base member 30. The member 34 is large enough so as to extend entirely around the bird feeder, being made of a single planar member or made up of several individual trough portions secured tightly together, such as by waterproof glue, fasteners, or a combination of these. Wood or plastic may be utilized in the construction of the trough member or members, the exact construction being determined by the size of the bird feeder and the particular design utilized. Birds feeding from the trough member 34 typically perch on the edge 36. Advantageously, the perch extends outwardly from the vertical centerline of the bird feeder less far than the outer edges 58 of the roof member 50. The reason for this construction is so that water dripping off of the roof does not fall into the trough 34, which would have the effect of causing the bird seed to become wet.

As revealed in FIG. 3 as well as in several of the other figures of drawing, some embodiments of my bird feeder are designed such that the bird seed deposited therein does not come into direct contact with the interior of the side members 12. Any contact with the side members is prevented in such embodiments by the use of an elongate central repository 40 for bird seed, as shown in further detail in FIGS. 3, 3A and 8, which central repository may be cylindrically shaped and made of a strong plastic. However, I am not limited to the elongate central repository being cylindrically shaped, for it could have a square cross section, for example. Quite obviously, the central repository 40 could be constructed of a suitable material other than plastic.

The central repository 40, which preferably is made of transparent material such as of strong plastic, has an open top 42 and an open bottom 44, with the top being open so that bird seed can be readily poured from above into the top of the repository at the time refilling is necessary. Because the bottom 44 of the central repository is also open, bird seed can flow, under the influence of gravity, from the repository and through the lower rectangularly-shaped slot or passageway 18 located in the bottom of many if not all of the side members 12.

From FIGS. 1, 2 and other such figures, it is apparent that the bird seed flows or pours from the slots or passageways 18 out onto the upper surface of the trough member 34. The trough member 34 may preferably be regarded as a part of the base member 30, as previously mentioned, and preferably extends entirely around the bird feeder, although I am not to be limited to this.

To aid in the refilling of the central repository 40 without undue spilling, I preferably utilize a generally funnel-shaped member 60 in cooperative relationship with the open upper end 42 of the central repository. As revealed in FIG. 3A, the funnel-shaped member 60 is typically mounted as a part of roof member 50, being supported from the member or members 52 that extend generally horizontally from one side of the roof to the other, at a location directly above the tops of the side members 12.

The outer edges of the member or members 52 are typically in direct contact with the angularly-disposed upwardly extending components 54 of the roof member 50. In the event the bird feeder is supported from below, such as from a post 32, the horizontally-disposed members 52 serve to directly support the angularly disposed components 54 of the roof.

Returning to FIG. 3, it will be noted in this figure that I have utilized several small, outwardly pointing arrows in order to depict the flow directions for bird seed placed in the central repository 40, which bird seed is flowing outwardly from the open bottom portion 44. This outward flow is made uniform by my use of a flow director device 46 located on the vertical centerline of the central repository 40, which may well be coincident with the vertical centerline of the bird feeder 10. The flow director may rest on an interior portion of the trough member 34.

The flow director 46 is generally pyramidal shaped, having four downwardly sloping side edges in the event the bird feeder has four sides; note FIG. 3. On the other hand, and as indicated in FIG. 9, the flow director 146 in this embodiment may have six downwardly sloping side edges in the event the bird feeder has six sides.

Obviously I do not wish the bird seed to pour out of the lower rectangularly-shaped slots or passageways 18 onto the ground, so I accordingly utilize the previously mentioned elongate trough 34 around the four sides of the bird feeder of FIGS. 1 through 6, which trough is in turn surrounded by the edge member 36. The trough 34 is located adjacent the lower part of each side member 12, and located below the slots or passageways 18 located adjacent the bottom of at least some of the side members. Each slot or aperture 18 is in contact with the central repository 40, and this arrangement enables the bird seed to flow under the influence of gravity from the repository, along one of the downwardly inclined surfaces of the flow director, through the respective slot or passageway 18, and thence outwardly onto a portion of the trough 34 near a given slot or aperture 18.

Figure 5:
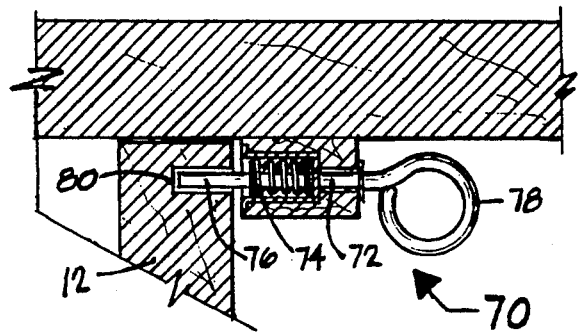
FIG. 5 is a fragmentary view to a large scale of the easily operated roof latching arrangement I prefer to use, as will permit the roof member to be readily removed when access to the interior of the bird feeder is needed.
Figure 3A:
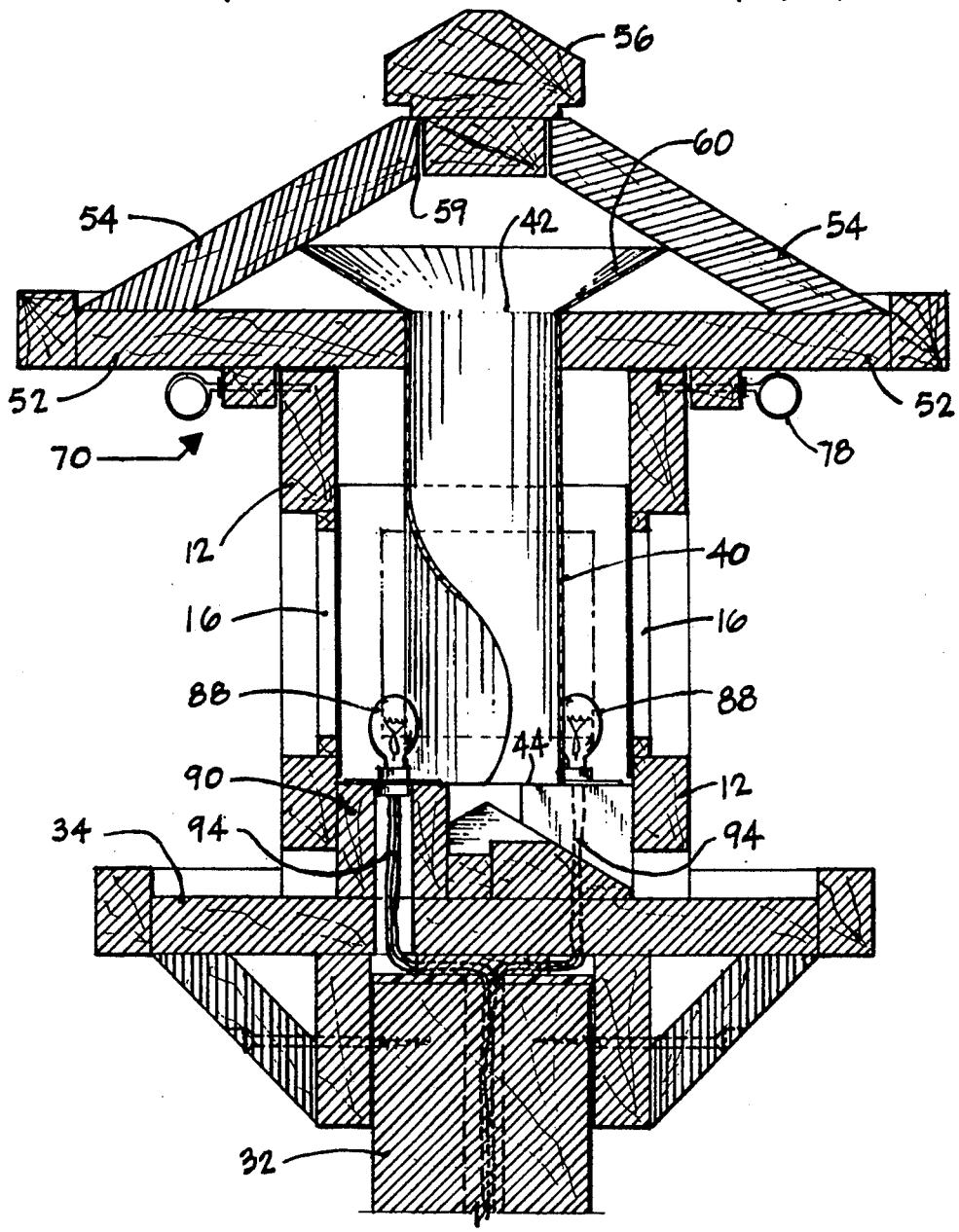
FIG. 3A is a cross sectional view of this entire embodiment of my bird feeder, created along the line indicated by the arrows 3A—3A in FIG. 3.

Advantageously, several of the embodiments of my invention involve the roof 50 being removable, and construction readily permitting this is revealed in FIGS. 3A, 5 and 8. In the event the roof as a whole is to be removed, this may be accomplished at such time as the central repository 40 is to be refilled with bird seed. The details of the preferred construction making the roof readily removable will be discussed shortly.

Figure 4:
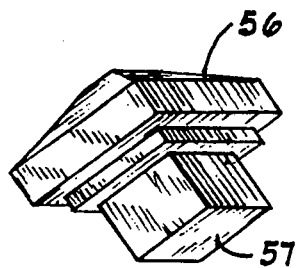
FIG. 4 is a fragmentary perspective view of the removable member that can be utilized at the top of the roof member, so that the bird seed can be replenished without having to remove the entire roof member.

On the other hand, I may provide a readily removable central member 56 of the roof 50, which member is visible in FIGS. 1, 2, 3A and 4 and which is readily separable from the main portion of the roof member. As depicted in FIG. 4, the central member 56 has a lower portion 57 that fits relatively tightly onto a central hole or aperture 59 that I provide in the highest point or apex of the roof. The lower portion 57 can either be square, as shown in FIG. 4, or else it can be round, with the aperture 59 being configured in a like manner. Because the central member 56 is readily removable, birdseed can be poured into the funnel-shaped member 60 and thence into the open upper portion 42 of the central repository 40 merely by removing the central member; note FIG. 8B.

Referring back now to the removability of the entire roof member 50, FIGS. 3A, 5 and 8 involve a roof latching arrangement 70 making use of a slidable pin equipped with a pull ring, with the slidable pin being mounted in a structural member forming a part of the roof. With particular reference to FIG. 5, which has been created to a larger scale than the other figures, it will be seen that each of the slidable pins 72 is spring biased, such as by a compression spring 74, in a direction causing the outer tip 76 of the slidable pin, that is, the end opposite the pull ring 78, to move into contact with a suitable hole 80 located in an upper portion of one of the side members 12.

Because of the arrangement I prefer, the two oppositely placed slidable pins utilized in accordance with the preferred roof latching arrangement 70 normally remain in contact with the side members of the bird feeder, thus holding the top or roof portion 50 of the feeder in place.

At such time as the user wishes to remove the roof member 50, he or she inserts a finger in each pull ring 78, and then pulls strongly enough so as to overcome the bias of the respective springs 74. This causes the outer end or tip 76 of the slidable pin 72 to move out of contact with the hole 80 in the side of the feeder, thus permitting the roof member 50 to be removed as a single entity. This convenience is particularly useful when it is desirable to gain access to the interior of the feeder 10.

One of the important aspects of my bird feeder involves at least some of the side members 12 being fitted with a closed, watertight window 16 of transparent material, as mentioned hereinbefore. It should be mentioned, however, that I am aware of the fact that many birds, upon seeing a reflection in a glass, will attack the glass as a supposed enemy. Desiring to avoid the windows 16 having a characteristic such that light is reflected therefrom, I prefer either to use non-reflecting glass or non-reflecting plastic in the windows 16. As an alternative to this, however, the window material can be translucent instead of being transparent or instead of possessing an anti-glare characteristic.

In accordance with a preferred embodiment of my invention, I may provide a source of illumination in the interior of my bird feeder, such that light can be projected outwardly through the windows 16. As revealed in FIG. 3A, the source of illumination may be one, a pair, or a larger number of incandescent bulbs 88. These bulbs may be located on suitable mounting means 90 that may in turn be supported either from the base member 30, or from the side members 12. Another form of illumination than incandescent bulbs may be utilized if such is desired.

Current may be caused to flow through the filaments of the bulbs by automatic means, such as by a timer operated switch, or by a light-actuated switch, such that the lights comes on at sundown, and go off at sunrise. On the other hand, the light bulb or bulbs may be turned on by a switch located in the home of the person tending the bird feeder. These possibilities will be discussed hereinafter.

As shown in FIG. 3A, I provide suitable electric wiring 94 serving to provide electric power to the bulbs or other lighting means. In the case of the bird feeder supported by a post 32, as indicated in FIG. 3A, the electric wires may run in a protected manner along the outside of the post 32, but more appropriately in certain circumstances, the wires may extend from an underground or an above-ground source, up through the center of the post. As revealed in FIG. 3A, the wiring 94 may then divide so as to extend to each of the bulbs utilized. To prevent damage to the wires, and at the same time to permit the bird feeder to be mounted in a stable manner, I utilize a spacer member in the form of a flat plate 98 on the uppermost part of the post 32; note FIG. 7.

With reference now to FIG. 6, it will be noted that the mounting means 90 for the electric bulbs 88 are revealed in further detail, as is the four-sided flow director 46. It is to be understood that the illumination from the bulbs 88 will be directed through all four of the windows 16 utilized in accordance with this embodiment of my invention.

Slightly visible in FIG. 6 are portions of the lower rectangularly-shaped slots or passageways 18, which in each instance are disposed under the windows 16. It is through these slots that bird seed flows outwardly onto the respective trough portion or member, as has been previously explained.

With reference now to FIG. 7, and continuing with the four-sided embodiment of my bird feeder, it will be seen that I have shown a single piece trough member 34, with only a fragmentary portion of the edge 36 being revealed in this figure. I am not to be limited to any one particular form of construction, for the trough member 34 could be made of a single piece of wood or plywood, or from a suitable industrial grade plastic. I drill or form one or more holes of appropriate size in the member 34, so that one or more pairs of wires can provide electric current for energizing the illumination means.

In the embodiment depicted in FIG. 7, the electric wiring 94 is contained in an enclosure strip 96 that runs along the outside of the post 32 in a water tight manner. After reaching the upper surface of the member 32, the wiring then branches so as to run under the trough member 34 to holes provided in the member 34 and mounting means 90 and then supply electric current to the sockets or receptacles in which the bases of the bulbs 88 are mounted.

Also shown in FIG. 7 is the flat plate 98 that typically resides directly on the top of the post 32, which flat plate serves directly as a spacer between the planar member 34 and the top of the post. Part of the space made possible by the use of the flat plate 98 is utilized for containing the branched out portions of the electric wiring 94.

With reference now to FIG. 7A, it will be seen that I have depicted an arrangement in which my novel bird feeder 10 is disposed upon the top of a post 32. Electric power is supplied to the wiring 94 of the bird feeder from an underground low voltage cable 102, with the wiring 94 being electrically attached in a proper manner to a connector 103. The cable 102 and the connector 103 are supplied with electric current from a transformer 105 that is disposed at a suitable remote location, such as on the wall of a house, garage, or other such building.

Supported adjacent the transformer 105 is a light sensor 107, which is responsive to ambient light. The arrangement I utilize preferably involves an electrically controlled switch that causes the illumination means inside the bird feeder 10 to turn on at sundown, and to turn off at dawn, but quite obviously I am not to be limited to this arrangement. The transformer is protected from the weather in a suitable manner, and is supplied with house current, typically at 110 volts A.C., from a suitable wall outlet, typically in the manner depicted in FIG. 7A.

Although I am not to be limited to the use of any particular transformer, I have found that a transformer such as a "Twilight" model #CB721, a 72 watt device manufactured by Smartel Incorporated, of Carrollton, Tex. may be utilized quite effectively in many instances. This type of transformer is designed for use with low voltage garden 1 ighting, and has automatic photocell-/timer control as well as a manual switch. Quite obviously, another arrangement could, if desired, be utilized for providing a suitable amount of electric current to the illumination means utilized inside the bird feeder.

With reference to FIG. 8, it will be seen that I have provided an embodiment of a multi-sided bird feeder that closely resembles the earlier embodiment, but in this instance no supporting post is utilized. Rather, I utilize an arrangement that involves a bird feeder supported from above, such as from a cable, chain or strong cord, but in this instance, I prefer to utilize a hollow metallic tube 62, through which electric wiring 94 may extend so as to supply electric current to a selected type of illumination means, with incandescent. bulbs 88 being preferred.

The upper end of the hollow metallic member or tube 62 is threaded, enabling it to be attached by a pair of nuts 64 to a U-shaped bracket 66 extending downwardly from the ceiling. Likewise, the lower end of the hollow metallic member or tube may be threaded, so that a suitable nut 68 may threadedly engage the lower threads of the tube 62 after the bird feeder has been inserted upon the tube 62. As shown in FIG. 8, the weight of the bird feeder is borne by the nut 68, with a flat washer 69 being utilized immediately above the nut 68 to prevent damage to the underside of the bird feeder.

In accordance with this embodiment, a hole is provided through the central member 56, through which the hollow metallic tube 62 extends. In the event it is desired to raise the roof member 50, such as to replace a burned out bulb 88, this can be accomplished by sliding the roof member and the central member 56 upwardly along the hollow metallic tube 62 in the manner shown in FIG. 8A. In this way, the roof member 50 may be raised a sufficient distance as to grant ample access for bulb replacement.

When no bulb needs to be replaced, refilling of the central repository with bird seed may be accomplished merely by sliding the central member 56 upwardly along the hollow metallic tube 62, for this then permits the bird seed to be poured through the aperture in which the central member resides, directly into the central repository, as revealed in FIG. 8B.

Turning now to FIG. 9, it will be seen that I have here shown a plan view of a six-sided bird feeder 110 for dispensing bird seed or the like from a plurality of spaced-apart locations around the periphery of the device. The bird feeder of this embodiment has a plurality of vertically disposed, substantially identical side members 112. As in the case of the side members of the four-sided embodiment, each of the side members 112 has parallel side edges 114, meaning that the width dimension across the top of a side member is the same as the width dimension across the bottom.

Despite the fact that the side edges are parallel, the edges are preferably cut at an angle, rather than being square cut. In other words, both of the side edges of each side member have a bevel or mitre cut, so that a plurality of side members can be joined together to form a tightly fitted enclosure.

As depicted in both of these figures, each side member 112 may have a window 116 as well as a lower, rectangularly-shaped slot or passageway 118. It is not required that every side member of my bird feeder have a window as well as a lower, rectangularly-shaped slot, but it is typical for these to be included in each side member. By utilizing the previously-mentioned mitre or bevel cut along the side edges of the side members, the side members can be joined together to form a closed perimeter, as shown in FIG. 9.

Figure 10:
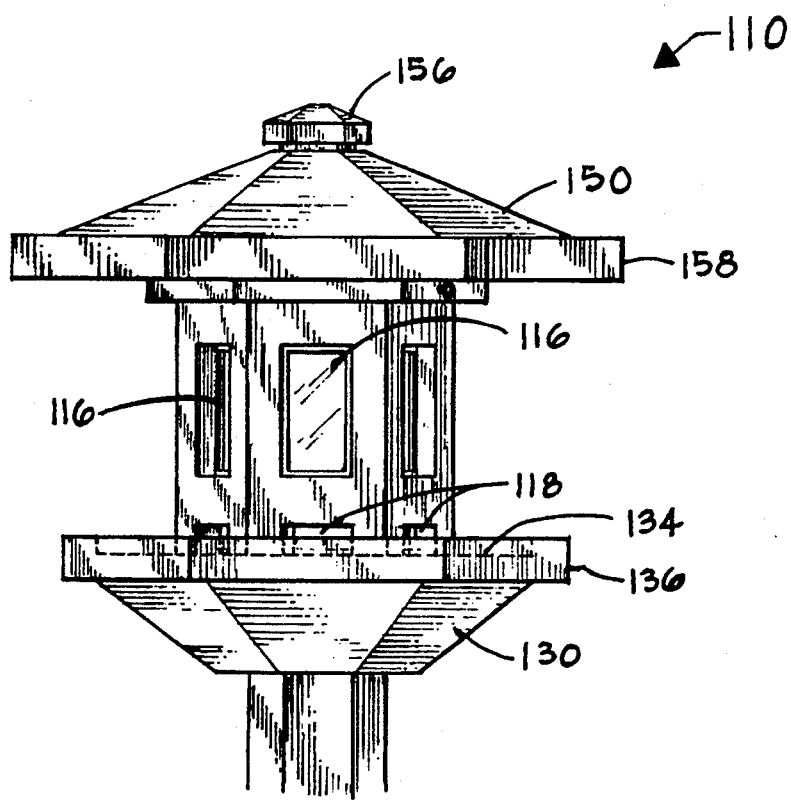
FIG. 10 is a side elevational view of the six-sided bird feeder depicted in FIG. 9.

Continuing with FIGS. 9 and 10, for a six-sided bird feeder, the side edges 114 are obviously cut at a 60° angle with respect to the exterior surface of the side member, to produce the beveled side edges. These beveled side edges of adjacent side members 112 are typically held together in a carefully aligned relationship by the use of weatherproof glue. If desired, however, I could hold the abutting beveled edges together by the use of nails, screws or other suitable types of joinder arrangements, either in addition to, or apart from, the glue being used.

Figure 11A:
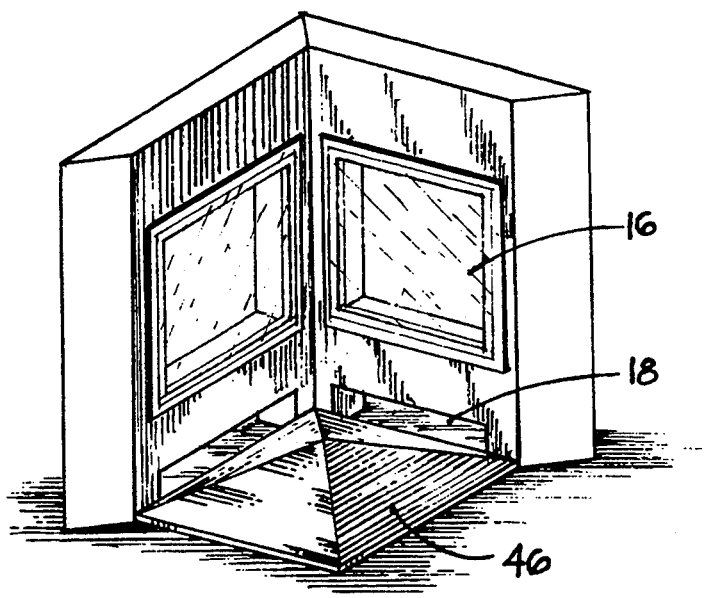
FIG. 11A is a fragmentary perspective view of the feeder depicted in FIG. 11.
Figure 11:
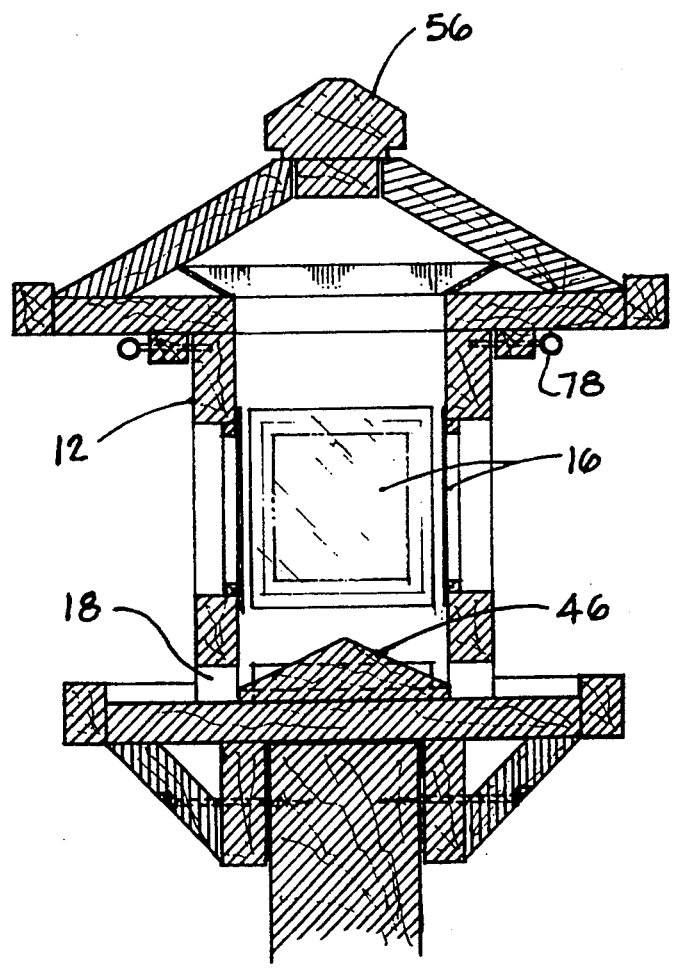
FIG. 11 is a side elevational view of a feeder in which no central repository for seeds is utilized.

From FIG. 10 it will be noted that I have provided a base member 130 and a roof member 150 that are common to the enclosure created by the joined side members 112, and it is to be realized that the base member and roof member together with the side members form a fully enclosed multisided bird feeder. In some embodiments, the bird seed added to the feeder from time to time to replenish the seed eaten by birds may not come into direct contact with the interior portions of the side members 112, as a result of the use of a central repository. However, in other embodiments, such as depicted in FIGS. 11 and 11A, I may eliminate the use of a central repository in the form of a separate, discrete member, with the result that the bird seed added to the interior of the feeder will come into direct contact with the glass panels.

The six-sided embodiment of my bird feeder depicted in FIGS. 9 and 10 is equipped with a trough member 134 that preferably forms the upper part of the base member 130. The member 134 is large enough so as to extend entirely around the bird feeder, being made of a single planar member or made up of several individual members secured tightly together, such as by waterproof glue, fasteners, or a combination of these. The exact construction is determined by the size of the bird feeder and the particular design utilized.

As revealed by FIG. 10, the outer peripheral edges of the trough member involve the use of an edge or rim member 136. Birds feeding from the trough member 134 typically perch on the edge 136. Advantageously, the perch extends outwardly from the vertical centerline of the bird feeder less far than the outer edges 158 of the roof. The reason for this construction is so that water dripping off of the roof does not fall into the trough 134, which would have the effect of causing the bird seed to become wet.

As in the case of the embodiment of FIGS. 3, 3A and 8, any contact of the bird seed with the side members of the embodiment shown in FIGS. 9 and 10 is prevented by the use of an elongate central repository 140 for bird seed, which central repository may be cylindrically shaped as shown in FIG. 9, and made of a strong, transparent plastic. However, I am not limited to the elongate central repository being cylindrically shaped, for it could have a square cross section, for example. Quite obviously, the central repository 140 could be constructed of a suitable material other than plastic.

It is to be understood that the central repository 140 has an open top and an open bottom, with the top being open so that bird seed can be readily poured from above into the top of the repository at the time refilling is necessary. Because the bottom of the central repository is also open, bird seed can flow, under the influence of gravity, from the repository through the lower rectangularly-shaped slot or passageway 118 located in the bottom of many if not all of the side members 112.

As will be recalled from the previous embodiment, the bird seed flows or pours from the slots or passageways 118 out onto the upper surface of the trough member 134. The trough member 134 may preferably be regarded as a part of the base member 130, as previously mentioned, and extend entirely around the bird feeder, although I am not to be limited to this.

To aid in the refilling of the central repository 140 without undue spilling, I preferably utilize a generally funnel-shaped member in cooperative relationship with the open upper end of the central repository, and as discussed in conjunction with FIG. 3A, the funnel-shaped member is typically mounted as a part of roof member 150, being supported from the member or members that extend generally horizontally from one side of the roof to the other, at a location directly above the tops of the side members 112.

As in the case of previous embodiments, I may utilize a central member 156 at the top of the roof member 150, so that the central repository of the six-sided embodiment can be refilled with bird seed merely by removing the member 156, and then pouring the bird seed directly into the central repository.

Alternatively, the central repository can be refilled with bird seed by entirely removing the roof member 150. I utilize the same roof latching arrangement in connection with the six-sided embodiment as I utilize in conjunction with the four-sided embodiment, which I discussed in conjunction with FIGS. 5 and 6.

As should now be apparent, the utilization of illumination means in my novel bird feeder provides several distinct advantages, which are as follows:

a) The illumination means serves to attract insects which, in turn, attract nocturnal feeding birds such as the whip-poor-will, chuck-wills-widow, nighthawks, the pauraque and others.

b) The light discourages nocturnal feeding animals such as mice, rats, opossum and raccoons.

c) Heat generated by the electric bulbs keeps the bird seed warm and dry, which prevents caking due to cold, damp or freezing weather.

d) It provides safety. For best access and viewing of birds, the feeder should be mounted at eye level, thus creating a potential hazard to humans after dark, especially with the suspended-type unit, unless illumination means are utilized.

e) It can provide welcome illumination in an otherwise dark portion of a yard or other area.

Embodiments of my invention other than those specifically depicted herein may be obvious to the user, and I am not to be limited except as required by the scope of the appended claims.

I claim:

1. A multisided bird feeder for dispensing bird seed from a plurality of spaced-apart locations, said bird feeder having a plurality of vertically disposed, substantially identical side members secured in an edge-to-edge relationship to form a closed perimeter, a base member and a roof member common to said side members, with said base member and roof member together with said side members forming an enclosed multisided bird feeder, a repository for bird seed located in a central interior portion of said feeder, anelongate trough portion operatively associated with a lower part of said bird feeder, an aperture located in certain of said side members, just above the trough portion, each aperture enabling seed to flow from said repository into the trough portion, a perch formed along an outboard portion of said trough portion, upon which a bird can stand while eating seed from said trough portion, at least some of said side members being fitted with a window of transparent material, and a source of illumination contained in said interior portion of said bird feeder, such that light can be projected outwardly through said windows, for the benefit of birds that feed nocturnally.

2. The multisided bird feeder as recited in claim 1 in which a light sensor and an electrically controlled switch are operatively associated with said source of illumination, said sensor and said switch functioning cooperatively to cause said source of illumination to turn on at sundown, and to turn off at dawn.

3. The multisided bird feeder as recited in claim 1 in which said repository for bird seed is a separate, elongate member spaced away from said side members of said feeder.

4. The multisided bird feeder as recited in claim 1 in which a flow director is located adjacent the lowermost portion of said repository for bird seed, said flow director serving to cause bird seed poured into said repository to flow in substantially equal quantities into the plurality of trough portions.

5. The multisided bird feeder as recited in claim 1 in which said roof member is mounted in a manner separable from said side members, said roof member being readily removable to permit access to the interior of said bird feeder.

6. The multisided bird feeder as recited in claim 1 in which a central member on said roof member is readily separated from the main portion of said roof member, said central member being removable to permit bird seed to be poured into the uppermost portion of said central repository.

7. The multisided bird feeder as recited in claim 1 in which a trough portion is operatively associated with each side member.

8. The multisided bird feeder as recited in claim 1 in which mounting means for said bird feeder is located in an upper portion of said bird feeder.

9. The multisided bird feeder as recited in claim 1 in which mounting means for said bird feeder is located in a lower portion of said bird feeder.

10. The multisided bird feeder as recited in claim 1 in which said bird feeder has four sides.

11. The multisided bird feeder as recited in claim 1 in which said bird feeder has six sides.

12. A multisided bird feeder for dispensing bird seed from a plurality of spaced-apart locations, said bird feeder having a plurality of vertically disposed, substantially identical side members, each of said side members having substantially parallel side edges, the side edges of said side members being joined together to form a closed perimeter, a base member and a roof member common to said side members, with said base member and roof member together with said side members forming a fully enclosed multisided bird feeder, a repository for bird seed located in a central interior portion of said feeder, an elongate trough operatively associated with a lower part of certain side members, an aperture located in said certain side members, just above the respective trough, each aperture enabling seed to flow from said repository into the respective trough, and a perch formed along an outboard portion of certain troughs, upon which a bird can stand while eating seed from the trough, at least some of said side members fitted with a window of transparent material, and a source of illumination contained in said interior portion of said bird feeder, such that light can be .projected outwardly through said windows, for the benefit of birds that feed nocturnally.

13. The multisided bird feeder as recited in claim 14 in which said roof member is mounted in a manner separable from said side members, said roof member being readily removable on occasion, to permit access to the interior of said bird feeder.

14. The multisided bird feeder as recited in claim 12 in which a central member on said roof member is readily separated from the main portion of said roof member, said central member being removable to permit bird seed to be poured into the uppermost portion of said central repository.

15. The multisided bird feeder as recited in claim 12 in which said repository for bird seed is a separate, elongate member spaced away from said side members of said feeder.

16. The multisided bird feeder as recited in claim 12 in which a flow director is located adjacent the lowermost portion of said repository for bird seed, said flow director serving to cause bird seed poured into said repository to flow in substantially equal quantities into the plurality of troughs.

17. The multisided bird feeder as recited in claim 12 in which each of said troughs operatively associated with said side members are part of a trough member of unitary construction and supported from said base member.

18. The multisided bird feeder as recited in claim 14 in which means for automatically turning on said source of illumination is provided, said means functioning in response to conditions of darkness.

19. The multisided bird feeder as recited in claim 12 in which mounting means for said bird feeder is located in an upper portion of said bird feeder.

20. The multisided bird feeder as recited in claim 12 in which mounting means for said bird feeder is located in a lower portion of said bird feeder.

21. The multisided bird feeder as recited in claim 12 in which said bird feeder has four sides.

22. The multisided bird feeder as recited in claim 12 in which said bird feeder has six sides.

23. A bird feeder for dispensing bird seed, said bird feeder having a plurality of side members secured in an edge-to-edge relationship to form a closed perimeter, a base member disposed below said side members and a roof member disposed above said side members, with said base member and roof member together with said side members forming an enclosed multisided bird feeder having a central interior portion serving as a repository for bird seed, an elongate trough portion operatively associated with a lower part of certain of said side members, and an aperture located in said certain side members, just above the respective trough portion, each of said apertures enabling seed to flow from said repository into the respective trough portion, at least some of said side members being fitted with a closed window of transparent material, and a source of illumination contained in said interior portion of said bird feeder, such that light can be projected outwardly through said windows, for the benefit of birds that feed nocturnally.

* * * * *